Jan. 5, 1960 W. A. CUBBERLEY 2,919,827
JUNCTION BOX FOR FLOOR DUCT SYSTEMS
Original Filed Sept. 14, 1956 2 Sheets-Sheet 1

INVENTOR
Walter A. Cubberley
BY
Pennie Edmonds Morton Barrows Taylor
ATTORNEYS

Jan. 5, 1960  W. A. CUBBERLEY  2,919,827
JUNCTION BOX FOR FLOOR DUCT SYSTEMS
Original Filed Sept. 14, 1956  2 Sheets-Sheet 2

INVENTOR
Walter A. Cubberley
BY
ATTORNEYS

United States Patent Office 2,919,827
Patented Jan. 5, 1960

2,919,827

JUNCTION BOX FOR FLOOR DUCT SYSTEMS

Walter A. Cubberley, Narberth, Pa., assignor to Walker Brothers, Conshohocken, Pa., a corporation of Pennsylvania Continuation of application Serial No. 609,876, September 14, 1956. This application February 3, 1959, Serial No. 791,247

12 Claims. (Cl. 220—3.7)

This invention relates to junction boxes for use at the intersections of runs of a plurality of ducts in a floor duct system of electrical distribution of the kind now widely installed in business, industrial, and institutional buildings. More particularly, the invention is concerned with a novel junction box of the type referred to, which is less expensive to produce than prior similar boxes and is provided with partition means capable of being mounted in different arrangements within the box and removable and replaceable through the hand hole in the cover. The provision of such partition means, which are capable of rearrangement as described, makes possible the correction of an error in the installation of the box without the necessity of removing the box from the system and replacing it. The new box in a form suitable for use in a system consisting of pairs of ducts running at right angles to each other, affords all the advantages of the invention and such a box will be illustrated and described for purposes of explanation.

Prior junction boxes for use in two duct floor systems have commonly comprised a base and a cover, both of which are made of cast iron. The base is generally square in shape and its side walls have pairs of openings for receiving the ends of ducts. The base is provided with integral partition means defining raceways extending across the box between aligned duct openings, certain of the raceways lying beneath and others passing over horizontal parts of the partition means. The cover has the usual circular hand hole, which is closed by a plate, and the plate has a downwardly extending partition cooperating with the partition means within the base. In such a box, the raceways lying at right angles to each other and containing wiring of the same tension are open to each other within the box through openings through the partition means.

In the installation of the prior junction boxes of the type above described, it sometimes happens that the boxes are improperly placed in relation to the ducts, so that raceways, which are to contain wiring of different tension, are open to each other within the box. An error in the orientation of a box is discovered only when the system has been fully installed and, in order to correct the error, it is necessary, in the case of an underfloor system, to dig a hole in the floor to expose the box, remove the cover and disconnect the ducts, shift the box angularly, reconnect it to the ducts, and restore the cover. Making a change in the position of the box is thus an expensive and laborious operation.

The present invention is directed to the provision of a junction box, which is of lighter and less expensive construction than those heretofore used and in which the partition means may be rearranged by removal of the parts thereof from the box through the hand hole and their replacement in new positions in the box through the hole. With the new box, errors in installation can be quickly corrected without removal of the box from the system and the cost of correcting such an error in installation and the time consumed are minimized.

For a better understanding of the invention, reference may be made to the accompanying drawings, in which Fig. 1 is a plan view with parts broken away of one form of the new junction box;

Figure 1:
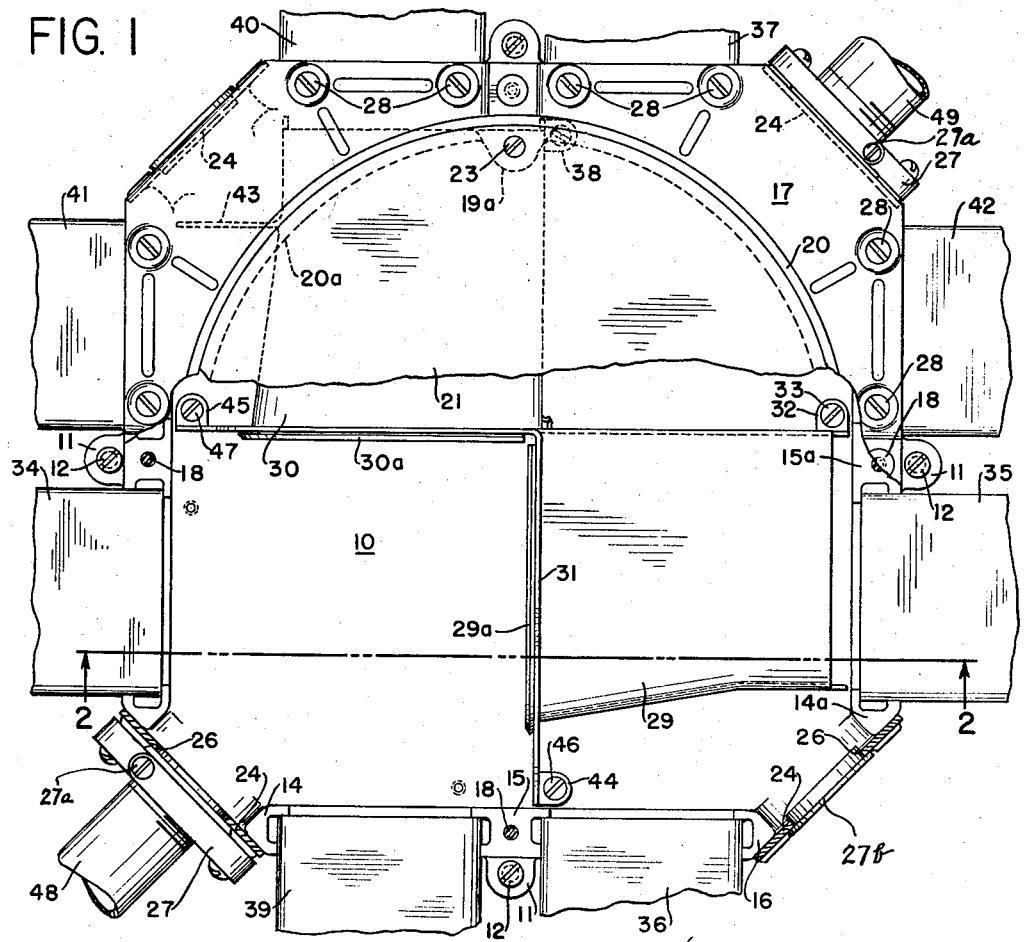
Figure 2:
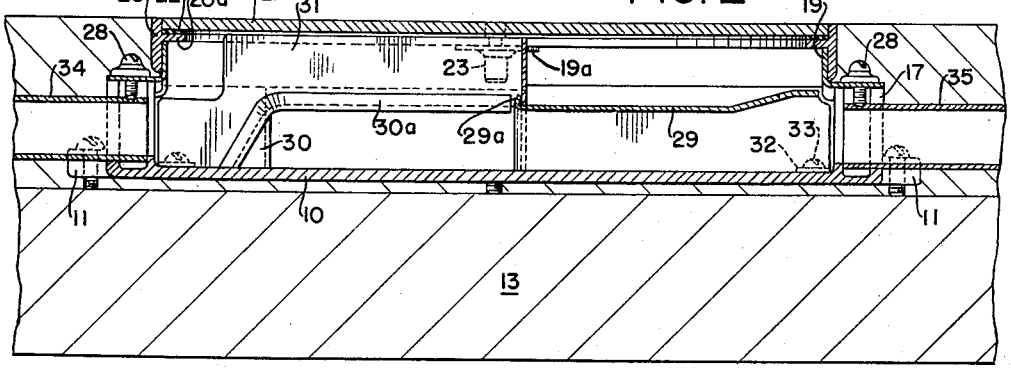
Fig. 2 is a sectional view on the line 2—2 of Fig. 1.
Figure 3:
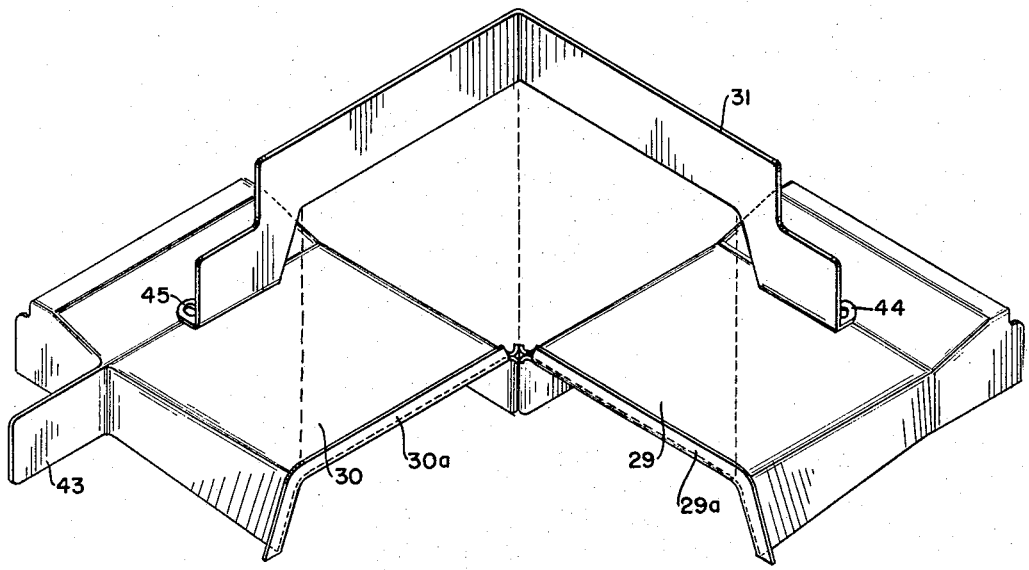
Fig. 3 is a view in exploded perspective of the partition members employed in the box shown in Figs. 1 and 2.
Figure 4:
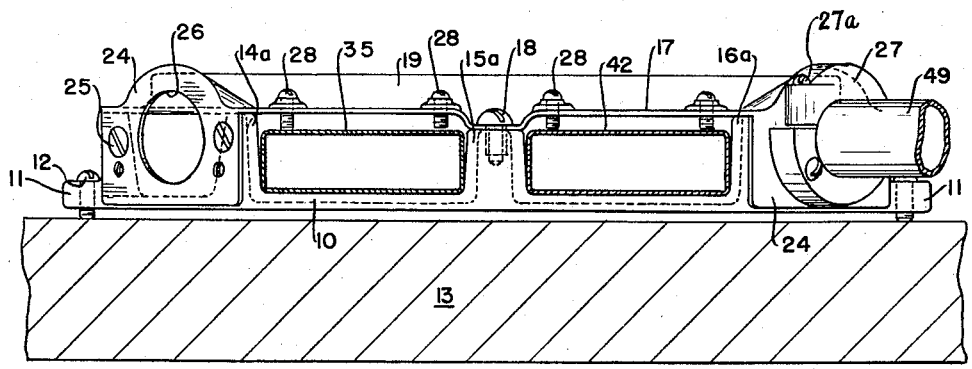
Fig. 4 is a view of the box in side elevation with ducts and a feeder conduit shown in section.

The box shown is for use in an underfloor duct system, in which there are two ducts in each run, and it includes a base plate 10, which is a casting square in outline with the corners cut off. The base is provided with laterally extending lugs 11, through which adjusting screws are threaded, and, in the installation of the system, the screws support the junction box on the floor slab 13 and can be adjusted to make it level. Three spaced projections 14, 15, and 16, which are integral with the base plate, rise from it along each of its side edges and partly define openings, in which the ends of ducts are received. The base plate and the projections 14, 15 and 16 constitute a base member.

A cover 17 rests on top of the projections and is secured to the projections 15 by screws 18. The cover has a central opening defined by a vertical flange 19 having spaced ears 19a extending inward from its top edge, and the opening is closed by a closure including a ring 20, which telescopes over flange 19 and has an internal flange 20a. A plate 21 rests on the flange 20a within ring 20 with a gasket 22 interposed between the plate and the flange and the plate is held in place by screws passing through the plate and into certain of the ears 19a. Adjusting screws 23 passing through the plate and into other ears 19a make it possible to raise and lower the closure, so that the upper edge of ring 20 and plate 21 will lie flush with the finished floor surface.

The cover 17 has ears 24 at its corners, which extend downwardly against the outer faces of the adjacent projections on the base and are secured thereto by screws 25. The ears have circular openings 26 and, when wiring is to be led into the box through the opening through one of the ears, an adapter plate 27 is secured to the outer face of the ear. The adapter plate has an opening, into which the end of a conduit for feeder wires can be inserted, and the plate is split and provided with a screw 27a, by which it can be tightened against the end of the conduit. The screws bear against the conduit and thus act to cause the plate to clamp the conduit and also serve as a grounding screw between the conduit and the box. If wiring is not to be introduced into the box through an opening at a corner, the opening through the ear at that corner is closed by a plug 27b. The cover defines the tops of the openings for the ducts and has grounding screws 28, which can be tightened against the ends of the ducts inserted into the openings.

The space within the box is divided into raceways for wiring by partition members 29, 30, and 31, which are made of sheet metal. The partition member 29 is of inverted trough form and it is provided with an ear 32, by which it may be secured to the base by a screw 33 passed through the ear and threaded into an opening in the base. When in place in the base member, the partition member lies in alignment with a pair of ducts, such as those designated 34, 35, and forms the top of a raceway leading across the box between the ducts. The partition member 29 is of such height that wiring can be passed across the box above it, so that the member forms the bottom of a raceway extending between aligned ducts 36, 37. The outer end of the partition member lies close to the projections 14a, 15a defining the opening, in which the end of duct 35 is received, and the side of the member lies spaced from projections 15, 16 at the adjacent side of the base.

The partition member 30 is similar to the partition member 29 and it has an ear 38, by which it can be secured to the base plate. The member 30 forms the top of a raceway extending between ducts 39, 40 and the bottom of a raceway extending between ducts 41, 42. The partition member has a lateral fin 43, which terminates close to the projection at one side of the opening, into which the end of duct 41 is received.

The partition member 31 is formed of a strip of metal made up of two sections lying at right angles to each other. When the partition members 29, 30 are installed, they meet at their inner corners and the partition member 31 is adapted to overlie the inner ends of members 29, 30 and to engage vertical flanges 29a, 30a extending across the members 29, 30 at their inner ends. The member 31 is provided with ears 44, 45, by which it can be secured in place on the base plate by screws 46, 47 threaded through the ears and into openings in the base plate. The two parts of the partition member 31 form the side walls of raceways, which pass over the partition members 29, 30.

When the box is installed, the partition members 29, 30, and 31 may lie as illustrated in Fig. 1 and, with the arrangement shown, the wiring in ducts 34, 35 and 39, 40 must be of the same tension with the wiring supplied by feeder wires entering the box through a conduit 48 leading to one of the spaces in the box not covered by the partition members 29, 30. The wiring in conduits 36, 37 and 41, 42 are of a different tension from the first and this wiring may be supplied through a feeder conduit 49 leading into the other space within the box not covered by the partition members 29, 30, 31.

It sometimes happens that, in the installation of a floor duct system, the partition members 29, 30, 31 arranged as shown in Fig. 1 would be of the wrong orientation, in that the wiring in ducts 34, 35 may be of a different tension from the wiring in ducts 39, 40 and the wiring in ducts 36, 37 of different tension from the wiring in ducts 41, 42. When a junction box of the prior constructions was installed with its partitions in the wrong arrangement, it was necessary to disconnect the box from its ducts, to remove the box from the floor, to shift the box angularly through 90°, and then to replace the box in the floor and reconnect the ducts to it. Such an alteration in the position of a box was difficult and expensive, particularly in the case of an underfloor duct system, since the removal of a box from such a system required that a large hole be dug in the floor. With the present box, an error in installation can be easily corrected merely by removing the closure plate 21. With the closure open, the screws, such as those marked 33, 46, and 47, by which the partition members are held in place in the base, are accessible through the closure and, upon removal of the screws, the partition members can be removed through the closure opening and then replaced after having been turned through 90°. Such removal and rearrangement of the partition members to correct for an error in installation is relatively simple and does not require disconnection of the box from the ducts or removal of the box from the floor.

The formation of the box with the base a casting and the cover and partition members made of sheet metal greatly reduces the cost of manufacture and the weight of the box, so that the charges for shipping the box are reduced. Such a saving in cost and weight is possible because the raceways in the box are formed entirely by removable partition members instead of by integral portions of the base and the closure plate, as in former constructions.

This application is a continuation of my prior application Serial No. 609,876, filed September 14, 1956.

I claim:

1. A junction box for use at the intersection of runs of ducts in a floor duct system, which comprises a base member of substantially rectangular outline having spaced projections at its side edges, the projections defining the sides of openings aligned across the base for receiving the ends of ducts, a cover resting on top of the projections and having an opening through it, a closure for the cover opening, a plurality of separate partition members within the box and removably secured to the base member, each partition member being of inverted channel shape and each extending from adjacent the outer edge of the box inwardly, with one side of each partition member terminating adjacent the midsection of the box, the partition members being so arranged that their axes extend substantially at 90° to one another, each partition member forming a cover for part of a raceway for wiring extending across the box in one direction and a bottom part of a second raceway extending across the box at right angles to the first, and a separate, generally L-shaped vertical partition member secured to the base member at its ends and extending upwardly and over the other partition members adjacent their inner ends and cooperating with the other partition members to form side walls of raceways passing over the other partition members, the means for securing all of said partition members to said base member being accessible through the cover opening and the partition members being removable and replaceable through the cover opening.

2. The junction box of claim 1, in which the base member is a casting and the cover and partition members are of sheet metal.

3. The junction box of claim 1, in which the adjacent ends of adjacent side edges of the base members terminate short of one another and the corners of the base members are formed by edges connecting said adjacent ends, the cover has depending ears at the corners of the base member, and the ears have openings for passage of feeder wires into the box.

4. The junction boy of claim 3, in which adapter plates are secured to the outer faces of the ears and have openings for receiving the ends of conduits for the feeder wires.

5. The junction box of claim 3, in which one of the channels has a lateral partition fin terminating close to one side of the box.

6. A junction box for use at the intersection of runs of ducts in a floor duct system comprising a base, upwardly-extending portions rising from the side edges of the base and defining at least in part openings aligned across the base through which electric wires may pass, a cover member supported by the upwardly-extending portions and having an opening therein, a closure for the opening, at least two separate partition members within the box, means removably securing said separate partitions to the base in fixed relation to one another, the separate partition members having tops, side flanges connected to the tops and open bottoms, each separate partition member extending from an opening at one side of the box and inwardly at least to a position adjacent a plane extending through the center of the box and substantially normal to the direction in which the partition member extends, the outer edges of each separate partition member being beneath the peripheral edge portion of the cover, the top of each of said separate partition members forming a cover for a part of a raceway extending across the box and part of a bottom of a second raceway extending across the box at right angles to said first raceway, and at least one separate vertical partition member traversing the box and said first mentioned partition members and contacting said first mentioned partition members along an edge portion thereof, the ends of the vertical partition member having depending portions contacting the base member and having outwardly-extending ears, removable securing means passing through the ears and securing them to the base member, whereby the vertical partition member removably holds said first mentioned partition members in place on the base member the vertical partition member cooperating with said first-mentioned partition members and forming sidewalls of the raceways passing over said first-mentioned partition members, the means for securing all of said partition members to the base being accessible through the opening in said closure and all of the partition members being removable and replaceable through said opening.

7. A junction box for use at the intersections of runs of ducts in a floor duct system, which comprises a base member having space projections in its side edges, the projections defining the side edges of openings aligned across the base member through which electric wires may pass, a cover member for the box having an opening therein, at least two separate partition members within the box, the separate partition members having tops, side flanges connected to the tops and open bottoms, each separate partition member extending from an opening at one side of the box and inwardly at least to a position adjacent a plane extendnig through the center of the box and substantially normal to the direction in which the partition member extends, the outer edges of said separate partition members being beneath the peripheral edge portions of the cover, the top of each separate partition member forming a cover for a part of a raceway extending across the box in one direction and part of a bottom of a raceway extending across the box at right-angles to the first raceway, at least one separate vertical partition member traversing the box and said first mentioned partition members and contacting said first mentioned partition members along an edge portion thereof, the ends of the vertical partition member having depending portions contacting the base member and having outwardly-extending ears, removable securing means passing through the ears and securing them to the base member, whereby the vertical partition members removably hold the first mentioned partition members in place on the base member, the vertical partition member cooperating with said first-mentioned partition members and forming side walls of raceways passing over said first-mentioned partition members, and a closure for the opening in the cover member.

8. The junction box of claim 7 in which the means for securing all of said partition members to the base member are accessible through the opening in the cover member and all of the partition members are removable and replaceable through the opening in the cover member.

9. A junction box for use at the intersection of runs of ducts in a floor duct system comprising a base member and a cover member supported on and removably secured to the base member, the base member including spaced vertical members at its side edges defining the sides of openings aligned across the base member through which electric wires may pass, at least two separate partition members within the base member, the separate partition members having tops, side flanges connected to the tops and open bottoms, each separate partition member extending from an opening at one side of the box and inwardly at least to a position adjacent a plane extending through the center of the box and substantially normal to the direction in which the partition member extends, the outer edges of each separate partition member being beneath the peripheral edge portions of the cover, the top of each separate partition member forming a cover for a part of a raceway extending across the box in one direction and a part of the bottom of a raceway extending across the box at right angles to the first raceway, at least one separate vertical partition member traversing the box and said first mentioned partition members and contacting said first mentioned partition members along an edge portion thereof, the ends of the vertical partition members having depending portions contacting the base member and having outwardly-extending ears, removable securing means passing through the ears and securing them to the base member, whereby the vertical partition member removably holds said first mentioned partition members in place on the base member, the vertical partition member cooperating with said first-mentioned separate partition members and forming at least one side wall of a raceway passing over said first-mentioned separate partition members.

10. The junction box of claim 9 in which the means for securing all of said partition members to the base member are accessible when the cover member is removed from the base member, whereby at such time said securing means may be removed to permit independent rearrangement of the partition members within the base member.

11. A junction box for use at the intersections of runs of ducts in a floor duct system, which comprises a base member having spaced projection at its side edges, the projections defining the sides of openings aligned across the base member through which electric wires may pass, a cover supported by said projections, at least two separate partition members within the box and having tops, side flanges connected to the tops and open bottoms, said separate partition members extending inwardly from openings at different sides of the box, the outer edges of each of said separate partition members being beneath the peripheral edge portions of the cover, the top of each separate partition member forming a cover for a part of a raceway extending across the box in one direction and part of a bottom of a raceway extending across the box normal to the first raceway, and at least one separate vertical partition member traversing the box and said first mentioned partition members and contacting said first mentioned partition members along an edge portion thereof, the ends of the vertical partition member having depending portions contacting the base member, said depending portions each having an outwardly-extending ear, removable securing means passing through the ears and securing them to the base member, whereby the vertical partition member removably holds said first mentioned partition members in place on the base member, the vertical partition member cooperating with said first mentioned partition members and forming side walls of the raceways passing over said first mentioned partition members, the means for securing said partition members to the base member being accessible through the top of the box and all of the partition members being removable and replaceable through the top of the box.

12. A junction box for use at the intersections of runs of ducts in a floor duct system, which comprises a base member having spaced projections in its side edges, the projections defining the side edges of openings aligned across the base member through which electric wires may pass, a cover member for the box having an opening therein, at least two separate partition members within the box, the separate partition members having tops, side flanges connected to the tops, and open bottoms, said separate partition members extending inwardly from openings at different sides of the box, the outer ends of the said partition members being beneath the peripheral edge portions of the cover, the top of each separate partition member forming a cover for a part of a raceway extending across the box in one direction and part of a bottom of a raceway extending across the box at right angles to the first raceway, at least one separate vertical partition member extending across said first-mentioned partition members, and removable means securing said vertical partition members to the box, said vertical partition member removably holding said first-mentioned partition members in place on said base member, the vertical partition member cooperating with said first-mentioned partition members and forming side walls of raceways passing over said first-mentioned partition members, and a closure for the opening in the cover member.

References Cited in the file of this patent

UNITED STATES PATENTS

| | | |
|---|---|---|
| 607,989 | Erickson et al. | July 26, 1898 |
| 1,839,258 | Phillips | Jan. 5, 1932 |
| 1,909,136 | Thomas | May 16, 1933 |
| 1,949,883 | Sharp | Mar. 6, 1934 |
| 2,043,648 | Bissell et al. | June 9, 1936 |
| 2,046,351 | Walker | July 7, 1936 |
| 2,611,500 | Martin | Sept. 23, 1952 |

FOREIGN PATENTS

| | | |
|---|---|---|
| 233,798 | Great Britain | May 18, 1925 |
| 55,377 | Sweden | July 1, 1935 |